United States Patent Office 3,028,684
Patented Apr. 10, 1962

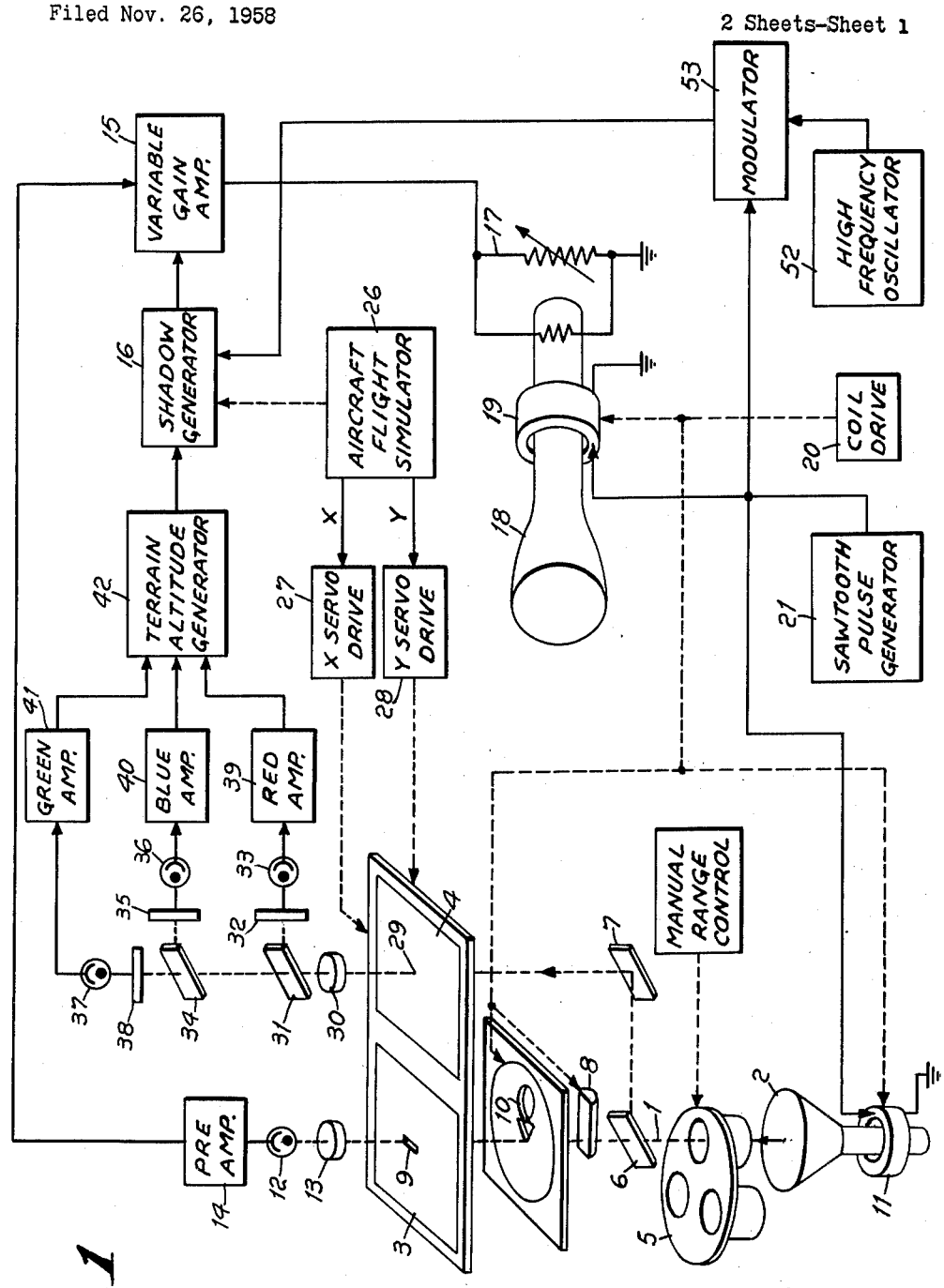

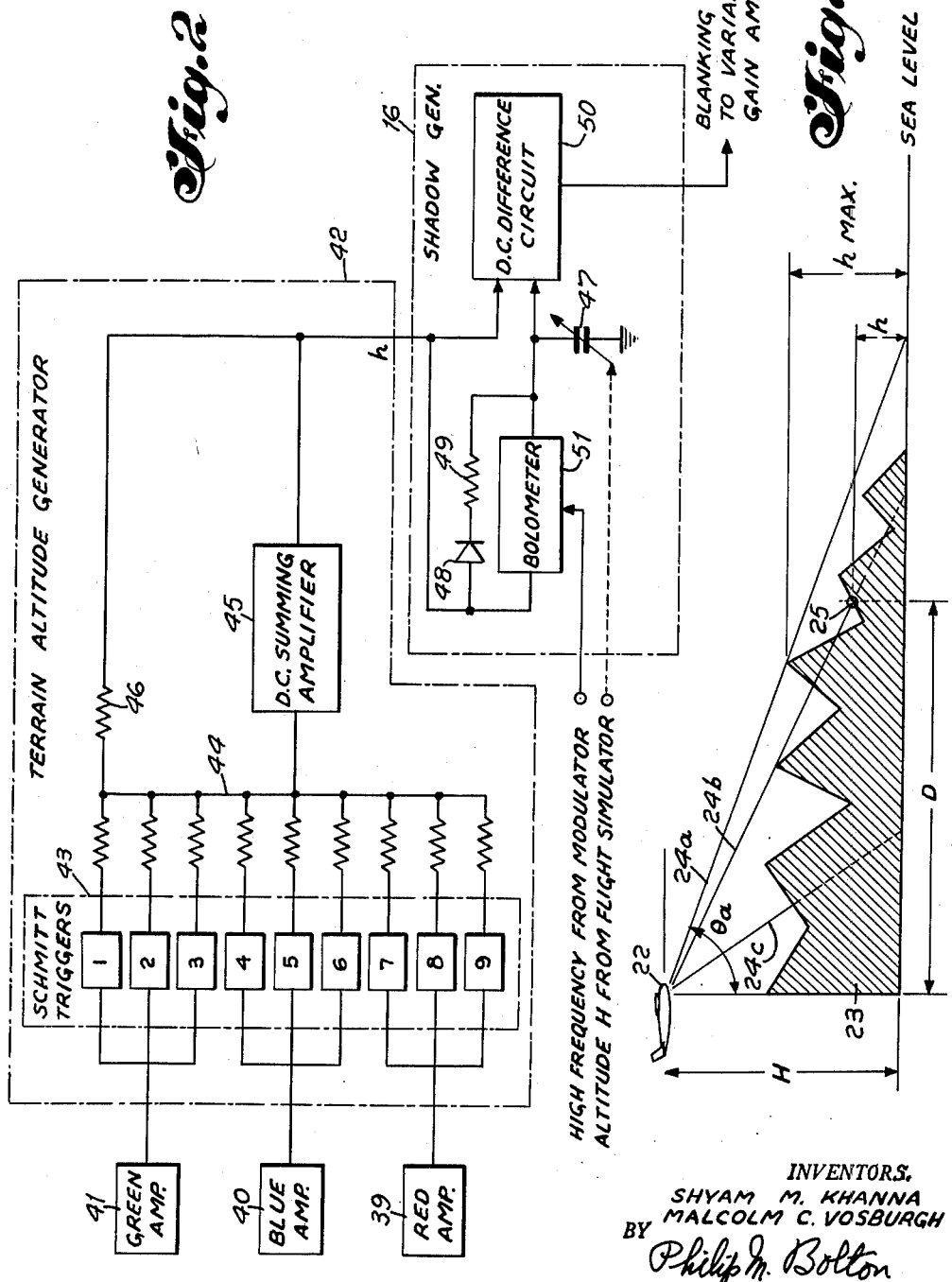

3,028,684
RADAR MAPPING SIMULATOR
Shyam M. Khanna, Nutley, and Malcolm C. Vosburgh, Montclair, N.J., assignors to International Telephone and Telegraph Corporation, Nutley, N.J., a corporation of Maryland
Filed Nov. 26, 1958, Ser. No. 776,506
3 Claims. (Cl. 35—10.4)

This invention relates to radar mapping simulators and more particularly to such simulators employing photographic storage means for storing terrain characteristics.

In the past, radar mapping simulators have been employed to train radar personnel in the use of airborne radar mapping systems. These simulators employ an ultrasonic vibrator in a large tank of water, the bottom of the tank forming a relief map of an area of terrain beneath an aircraft. In operation the ultrasonic vibrator emits signals from a height in the water scaled to the aircraft altitude. These vibrations are directed in the form of a beam simulating a radar beam and propagate through the water and reflect from the relief map in much the same way that radar signals propagate through the air and reflect from the ground. The reflected ultrasonic vibrations are then detected by a probe in the water preferably in the vicinity of the vibrator in much the same manner as reflected radar signals are detected by an antenna on board the aircraft from which the radar beam emanates.

In some cases, when such a radar mapping simulator is employed to simulate a radar scan of the terrain, the beam of ultrasonic vibrations from the ultrasonic vibrator is caused to sweep the relief map on the bottom of the tank from a point beneath the vibrator outward to a predetermined range with rotating strokes. Thus the position of the ultrasonic beam can be represented by polar coordinates obtained directly from the sweep mechanism driving the ultrasonic beam. This sweep mechanism also provides signals for driving a PPI type display, which may be a cathode ray tube, the intensity of this cathode ray tube being controlled by a signal representing the intensity of the reflected ultrasonic vibrations detected by the probe.

Such prior radar mapping simulators are true analogs of the real systems and thus inherently produce shadow effects. These shadows occur where a large terrain protuberance on the relief map blocks the beam of ultrasonic vibrations so that the beam does not reflect from terrain immediately adjacent to the protuberance. However, one feature of such prior systems which may be considered a limitation is that the scale of the relief map and the height of the ultrasonic vibrator, representing altitude must be the same if distortion is to be avoided. This requirement produces difficult problems in obtaining accuracy in the system. For example, if the relief map is to a scale of one inch equals one mile, then the dimensions of the relief map must be on the order of about 25 feet in order to cover a 300 mile area of terrain and the ultrasonic vibrator, simulating a radar beam from an aircraft at 12,000 feet altitude, would be located a mere 2 inches above the relief map. One problem posed by this scale feature of the prior systems is the difficulty of forming such a relief map to simulate ground protuberances. Even terrain protuberances a thousand feet in height must be represented by a little more than 3/16 of an inch.

Another disadvantage of such prior systems is that they are bulky, not readily moved and very difficult to replace because of the large size and weight of the relief map and the tank required to hold it.

In practice it is often desired to change the terrain map. In the past this has necessitated destroying the relief map and replacing it with another. Obviously, such a procedure is wasteful and time consuming requiring long intervals during which the simulator cannot be employed.

Therefore, it is an object of this invention to provide an improved radar mapping simulator having none of the above-mentioned limitations of prior systems.

It is another object to provide means for storing a multiplicity of discrete values in a continuous manner on a two-dimensional surface and means for obtaining said stored information as a function of said dimensions.

It is another object to provide means for storing signals representing terrain altitude in a continuous manner on a two-dimensional surface and to provide means for reading said stored information as a function of position on said terrain.

It is another object to provide means for storing information on a surface representing terrain reflectivity and means for attaining said stored information as a function of position on said terrain.

It is another object to provide means for storing signals representing terrain reflectivity and terrain height in continuous manners on relatively small easily manipulated surfaces and means for scanning these surfaces as a radar beam scans terrain to yield signals for energizing PPI means to thereby simulate a radar mapping system.

It is another object to provide means for employing said signal indicative of terrain height to generate signals for producing shadow effects on said PPI means.

It is a feature of this invention to provide different photographic storage means for storing signals representing terrain reflectivity and height and to scan these storage means with a beam of light, and to detect changes in said beam to provide signals indicative of terrain reflectivity and height.

It is another feature of this invention to employ a sheet of transparent material having variations of light and darkness throughout to represent variations of terrain reflectivity of a radar beam and to employ a similar sheet of transparent material having a multitude of intensity variations throughout each of a multitude of different colors to represent variations of terrain altitude.

It is another feature to employ different intensities of each different color on said similar transparent sheet which are readily distinguished from other intensities of the same color so that each intensity of each color is quite distinct and representative of discrete increments of terrain height.

It is another feature to sweep both said transparencies simultaneously with a split light beam from a flying spot scanner and to detect intensity of various colors in said light beam upon passing through said transparencies to yield said signals indicative of terrain reflectivity and altitude and to energize the intensity control of a PPI type cathode ray tube with said signal representing terrain reflectivity and to employ said signals representing terrain height in conjunction with other signals obtained from the sweep circuits of said cathode ray tube to generate a signal for modulating the intensity of said tube thereby creating an illusion of shadows such as would occur in a real radar mapping system display.

It is another feature to create said blanking signal by charging a variable capacitance through a unidirectional conductive device with a voltage indicative of terrain height, said capacitance being varied inversely with aircraft altitude, and to discharge said capacitance through an impedance which varies directly with the radial position of the beam of said flying spot scanner, meanwhile comparing the voltage on said capacitance with the voltage indicative of said terrain height to yield said blanking signal when the former exceeds the latter.

The foregoing and other objects and features of this invention and the manner of attaining them will become more apparent and the invention itself will be best understood by reference to the following description of an embodiment of the invention taken in conjunction with the accompanying drawings comprising FIGS. 1, 2 and 3 wherein FIG. 1 is a partially explode pictorial view and block diagram representing the radar mapping simulator; and FIG. 2 is a schematic and block diagram of a terrain altitude generator and a shadow generator, shown in FIG. 1, for generating a blanking signal to control the gain of variable gain amplifier shown in FIG. 1; and FIG. 3 is an elevational view of an aircraft scanning terrain from which to aid understanding the function of the system in FIGS. 1 and 2.

Turning first to FIG. 1 there is shown a beam of light 1 emanating from a flying spot scanner 2 for scanning two sheets of transparent material 3 and 4. Sheet 3 contains light and dark areas throughout representing the reflectivity qualities of terrain. These light and dark areas are located on transparent sheet 3 at positions representing terrain positions. Transparent sheet 4 contains varying intensities or shades of a multitude of different colors throughout, combinations of different shades of these different colors serving to represent terrain altitude. The colors might, for example, be green, blue and red and each of these colors might, for example, exist in three different shades. The light and dark areas throughout transparent sheet 3 are located dimensionally on the sheet in representation of the coordinates of a point on the terrain and the combinations of different shades of different colors located throughout transparent sheet 4 are also located to represent the coordinates of a point on the terrain. Obviously, sheets 3 and 4 may represent terrain reflectivity and height for a relatively large area of terrain such as, for example, many hundreds of miles in each dimension, and yet these transparent sheets may be relatively small in size, say for example two or three feet in each dimension. Modern photographic techniques provide high resolution transparencies on which distinguishable light and darkness intensities may be made between points a few hundredths of an inch apart and points of such separation on sheets 3 and 4 could readily represent points on terrain hundreds of feet apart. Consequently, the scale of sheets 3 and 4 could be on the order of a million to one and yield adequate simulation of a radar mapping for mapping a large area of terrain as will be evident from further description.

In operation, beam 1 from flying spot scanner 2 passes through a lens of lens turret 5 to half silvered mirror 6. Mirror 6 separates the beam into two paths by reflecting part of it to mirror 7 and passing another part through cylindrical lens 8. Lens 8 is shaped in the form of a half cylinder and, thus, alters pencil beam 1 giving it a rectangular cross-sectional shape as shown by the illuminated area 9 at the center of transparent sheet 3. Disposed between cylindrical lens 8 and sheet 3 is a rotating pattern 10 having the shape of a radar antenna pattern. Consequently, the length of the rectangular shaped beam from lens 8 is further shaped by pattern 10. As beam 1 from flying spot scanner 2 sweeps radially it moves down the length of lens 8. Thus the rectangular cross section of beam emanating from lens 8 moves up and down the length of pattern 10 and the long dimension of this rectangular cross-section is altered by the shape of pattern 10. In operation, both pattern 10 and lens 8 rotate together in synchronism with the rotating deflection coil 11 of flying spot scanner 2. As a result, the rectangular shape spot 9 on sheet 3 moves radially with rotated strokes and the longer dimension of this spot changes in accordance with the shape of pattern 10.

The light from spot 9 passes to photocell 12 via lens 13. Photocell 12 serves to detect the intensity of the light from spot 9. The output of photocell 12 is amplified by the amplifier 14 and applied to variable gain amplifier 15. The gain of amplifier 15 is varied in accordance with a blanking signal from shadow generator 16 and the output from amplifier 15 is applied to the intensity control 17 of PPI type cathode ray tube (C.R.T.) 18.

The deflection coil 19 of C.R.T. 18 is mechanically driven and electrically energized by the same sources that mechanically drive and energize deflection coil 11 of flying spot scanner 2. These driving and energizing means are coil drive 20 and sawtooth generator 21, respectively. In view of the common means for energizing and driving their deflection coils, flying spot scanner 2 and C.R.T. 18 are synchronized and both have the same type sweep. However, while the beam intensity in flying spot scanner 2 is constant, the beam intensity in C.R.T. 18 varies depending on the brightness of rectangular spot 9 on transparent sheet 3. Consequently, the image on the face of C.R.T. 18 is a display of terrain reflectivity such as is presented on a radar PPI display.

Turning next to FIG. 3 there is shown an elevation diagram by which to aid understanding the operation of the system for generating a blanking signal in the output of shadow generator 16 so as to create shadows on the face of C.R.T. 18 in representation of radar shadows in a real radar PPI display. In FIG. 3 there is shown an aircraft 22 at a height H above sea level. The terrain below the craft along its line of flight is shown in section as the area 23 and different projections of the radar beam from the aircraft in the direction of the terrain are represented by lines 24a, 24b and 24c. The angle one of these lines forms with the vertical, for example line 24a, is indicated by angle $\theta_a$. As the radar beam from aircraft 22 sweeps forward forming an ever increasing angle $\theta$, this beam reflects from the irregular surface of the terrain. When the angle of the beam at any particular instant, such as represented by angle $\theta_a$, is greater than the angle of a line from craft 22 to a point on the terrain such as point 25, a shadow will exist at such a point. By representing the point on the abscissa where the projection of the radar beam crosses, as being a distance D from a point directly below the aircraft, it can be stated, as a first approximation, that a shadow will occur during a single sweep of the radar beam from $D=0$ to $D=\text{max.}$, whenever $h$ is greater than the previous maximum value of $h$ denoted $h$ max. during the same sweep; said previous maximum diminishing at a rate $D/H \times h$ max. This approximation is reasonable in view of the very large ratio of aircraft altitude H relative to terrain height $h$.

A shaft rotation representing $1/H$ may be obtained from some computer or simulator such as aircraft simulator 26 shown in FIG. 1. This aircraft simulator may also energize position servos for positioning sheets 3 and 4 in two dimensions to simulate the path of the aircraft over the terrain whose reflectivity and height are represented in sheets 3 and 4. For this purpose $x$ and $y$ servo drives in FIG. 1, denoted 27 and 28 are energized by signals from aircraft simulator 26 which positions sheets 3 and 4.

Referring again to FIG. 3 a signal representing sweep distance D may be obtained from the output of sawtooth generator 21 and the following describes means for obtaining a signal representative of terrain height $h$. For this purpose, transparent sheet 4 is employed. The surface of this sheet is colored by, for example, three different colors and each of these colors is in multitude of different shades. Consequently, at a point on sheet 4 such as point 29, all three colors might exist each in one of a multitude of different shades. The purpose of the multiple colors and the multiple shades of each color is to provide a large number of different discrete signals each representing a different height of terrain. If three colors are employed such as green, blue and red and each color exists in four different intensity levels, including zero, then twelve different signals are available at any given spot on the surface or sheet 4. For example, spot 29 when illuminated can yield three of said twelve different signals. In terms of mathematical combinations, three different groups of four different signals taken three at a time one from each group yield 64 different combinations. Consequently, a light beam illuminating sheet 4 can produce signals representing 64 different discrete increments of terrain height. For this purpose, the beam 1 from flying spot scanner 2 is split by half silvered mirror 6 and a portion is reflected through transparent sheet 4 by mirror 7 to a lens system. Upon focusing by lens 30 the chromatic beam from spot 29 is reflected from half silvered mirror 31 through red light filter 32 to photocell 33. Consequently, the output of photocell 33 is representative of the amount of red in the chromatic light from spot 29. Half silvered mirror 31 also passes light to half silvered mirror 34 which reflects through blue light filter 35, serving to filter the light, applied to photocell 36. As a result the output of photocell 36 is indicative of the amount of blue light in the chromatic beam from spot 29. Another portion of the light from mirror 34 is applied to photocell 37 via green light filter 38 and as a result the output from photocell 37 is indicative of the amount of green light emanating from spot 29. The outputs of photocells 33, 36 and 37 are applied to amplifiers 39, 40 and 41 whose outputs are in turn applied to terrain altitude generator 42. This terrain altitude generator generates a voltage presenting discrete values of terrain height and this voltage is applied to shadow generator 16 which generates a blanking signal for controlling variable gain amplifier 15 so as to produce the illusion of shadows on the face of C.R.T. 18.

In FIG. 2 there is shown the details of the terrain altitude generator 42 consisting of nine of Schmidt trigger circuits 43 each responsive to a different signal level from one of the amplifiers 39, 40 or 41. For example, the output of each amplifier might energize three different Schmidt trigger circuits each responsive to different signal levels from the amplifier. Since the signal levels from each amplifier represent increments of height, the conducting state of each Schmidt trigger represents increments of height. For this purpose, the varying intensity of green light in the light beam emanating from surface 4 might represent increments of height on the order of 200 feet while blue light may represent increments on the order of 800 feet and red light might represent increments on the order of 3,200 feet. Consequently, if Schmidt triggers numbers 1, 4 and 7 where to conduct the height represented would be 200+800+3,200 or 4,200 feet. The output voltage of each Schmidt trigger when conducting is preferably the same and these output voltages are weighted by input network 44 to D.C. summing amplifier 45 having feedback resistor 46. Thus, the output of D.C. summing amplifier is a D.C. voltage having discrete values increasing with increasing terrain height $h$.

As heretofore stated a shadow occurs whenever $h$ is greater than the previous maximum value of $h$, denoted $h$ max., diminishing at the rate $D/H \times h$ max., during any particular radial sweep of a radar beam. Consequently, for simulation the blanking signal from shadow generator 16 is a function of the stored and instantaneous values of terrain height $h$, terrain distance $D$ and aircraft altitude $H$. In order to provide a signal indicative of aircraft altitude, terrain altitude generator 42 responsive to the outputs from amplifiers 39, 40 and 41 is employed. The D.C. voltage representing terrain height is fed to shadow generator 16 and charges variable capacitance 47 through diode 48 and low resistor 49. Variable capacitance 47 is mechanically varied by a shaft rotation from flight simulator 22 which is inversely proportional to aircraft altitude $H$ and the charge on capacitor 47 is applied to D.C. difference circuit 50. Bolometer 51 couples capacitance 47 to the voltage signal $h$ thereby providing a discharge path for the voltage on the capacitor when the voltage $h$ diminishes. The resistance of this bolometer is much greater than resistor 49 and thus the bolometer conducts very little current for charging capacitor 47 and serves only to discharge that capacitor to the voltage level $h$ when level $h$ decreases. The impedance offered by bolometer 51 is made proportional to the distance $D$ shown in FIG. 3 by an RF signal fed from high frequency oscillator 52 and modulated by modulator 53, both shown in FIG. 1. Modulator 53 serves to amplitude modulate the RF signal from oscillator 52 in a sawtooth manner by virtue of its coupling to sawtooth pulse generator 21. In operation, upon applying a given voltage representative of $h$ max. to capacitor 47 and varying that capacitance inversely in proportion to aircraft altitude $H$ while at the same time discharging capacitor 47 to the voltage level $h$ through bolometer 51 which is an impedance varying with $D$, there is created a voltage on capacitor 47 indicative of the quantity $D/H \times h$ max. Upon comparing this quantity with $h$ in D.C. difference circuit 50, a difference signal is produced representing shadows such as are created by a radar beam emanating from aircraft 22. The intensity of this difference signal, also referred to as a blanking signal, is representative of the depth of the shadow and upon applying it to variable gain amplifier 15 for controlling the intensity of C.R.T. 18, shadows are simulated on the face C.R.T. 18.

While in the above description we have referred to the use of light and various optical means, it is apparent that this term is to be taken broadly to include infrared and ultra-violet light also wherever appropriate.

Furthermore, while we have described above the principles of our invention in connection with specific apparatus, it is to be clearly understood that this description is made only by way of example and not as a limitation to the scope of our invention as set forth in the objects thereof and in the accompanying claims.

We claim:

1. A system for simulating radar terrain scanning comprising a plurality of transparent surfaces, one of said surfaces having light and dark areas throughout representing terrain reflectivity to radar signals as a function of coordinates on said terrain and the other having a multitude of different colors each in a multitude of intensities throughout representing terrain height, optical means for scanning said surfaces with a single light beam in a manner simulating radar beam scanning of terrain, first light sensing means responsive to light emanating from said one surface to produce signals representative of terrain reflectivity, second light sensing means responsive to light emanating from said other surface and including filter means to separate said colors after said scanning of said color transparent surface and means responsive to said filter means to derive signals indicative of height as determined by the intensity of a color, and means responsive to both said light sensing means for producing signals simulating reflected radar signals.

2. A simulator for simulating an airborne radar mapping system and plane position indicating type display associated therewith comprising a cathode ray tube display, a plurality of transparent surfaces, one having light and dark areas throughout representing the reflectivity of terrain to radar signals and the other having a multitude of different colors each in a multitude of different intensities throughout representing terrain height, means to produce a light beam for scanning said transparent surfaces, first light sensing means responsive to light emanating from said surface representing reflectivity producing signals for controlling the intensity of said display, second light sensing means responsive to light emanating from said multicolored surface for producing a signal indicative of terrain height, said second light sensing means including filter means to separate said colors after said scanning of said color transparent surface and means responsive to said filter means to derive signals indicative of height as determined by the intensity of a color, and means coupled to said second light detecting means for generating a blanking signal indicative of terrain shadows for altering the intensity control of said display.

3. A radar mapping simulator comprising a cathode ray tube radar display, a plurality of transparent surfaces, one of said surfaces having dark and light areas throughout representing the reflectivity of terrain to radar signals and the other having a multitude of different colors each in a multitude of intensities throughout representing terrain height, means for producing a light beam synchronized with said display and light sensing means responsive to light emanating from said surfaces for controlling the intensity of said display, means for shifting said light beam to simulate the pattern of a radar beacon, said light sensing means responsive to light emanating from said color transparent surface including filter means to separate said colors after said scanning of said color transparent surface and means responsive to said filter means to derive signals indicative of height as determined by the intensity of a color, and further including a multitude of lens systems for focusing said light beam to simulate the scale of terrain whose reflectivity is represented by the optical qualities of said surfaces.

References Cited in the file of this patent

UNITED STATES PATENTS

| | | |
|---|---|---|
| 2,737,730 | Spencer | Mar. 13, 1956 |
| 2,788,588 | Lindley | Apr. 16, 1957 |